United States Patent [19]

Stone

[11] Patent Number: 5,538,389
[45] Date of Patent: Jul. 23, 1996

[54] BIN POSITIONING DEVICE

[75] Inventor: Robert M. Stone, Tucson, Ariz.

[73] Assignee: Bishamon Industries Corporation, Ontario, Calif.

[21] Appl. No.: 372,517

[22] Filed: Jan. 13, 1995

[51] Int. Cl.⁶ ........................................................ B25J 5/00
[52] U.S. Cl. ............................ 414/778; 414/685; 414/754; 414/779; 254/3 R; 254/3 B
[58] Field of Search .................................... 414/685, 754, 414/778, 779; 254/3 R, 3 B, 3 C

[56] References Cited

U.S. PATENT DOCUMENTS

| | | | |
|---|---|---|---|
| 3,795,323 | 3/1974 | Ouska | 414/778 |
| 3,970,205 | 7/1976 | Del Puppo | 414/778 |

FOREIGN PATENT DOCUMENTS

| | | | |
|---|---|---|---|
| 1254861 | 5/1989 | Canada . | |
| 270055 | 7/1989 | Germany | 414/778 |
| 59-9731 | 10/1985 | Japan . | |
| 61-7198 | 1/1986 | Japan . | |
| 61-169499 | 7/1986 | Japan . | |
| 61-185792 | 11/1986 | Japan . | |
| 1-38154 | 4/1987 | Japan . | |
| 62-68999 | 4/1987 | Japan . | |
| 837344 | 6/1960 | United Kingdom | 414/685 |

*Primary Examiner*—Karen B. Merritt
*Assistant Examiner*—Douglas A. Hess
*Attorney, Agent, or Firm*—Antonio R. Durando

[57] ABSTRACT

A box tilter that comprises a movable chassis and a container-supporting frame directly hinged to the chassis. The actuating force for lifting and tilting the container is provided by a hydraulic cylinder connected in retractable pulling relation between the chassis and a radial arm rigidly attached to the container-supporting frame and projecting backward from the hinge point. This radial-arm configuration reduces the distance of the container from the operator of the device and results in improved access to the items in the container.

19 Claims, 8 Drawing Sheets

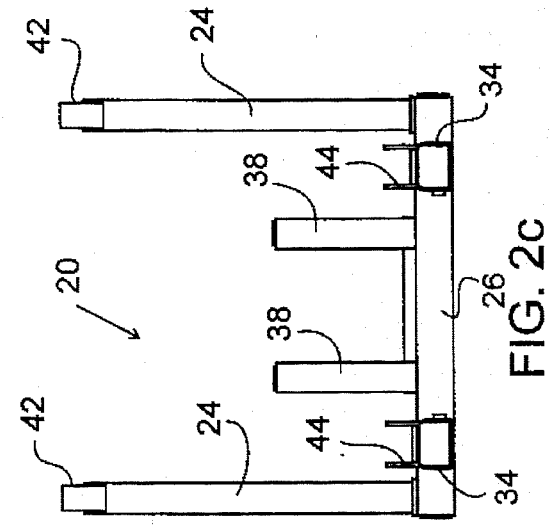
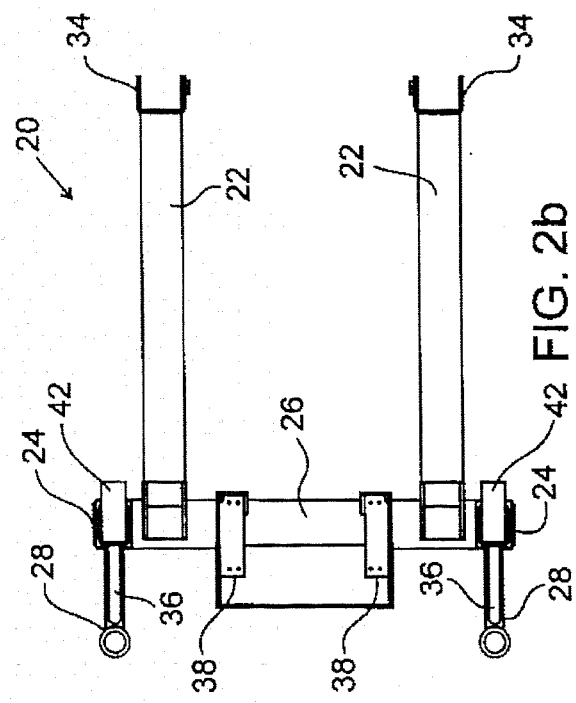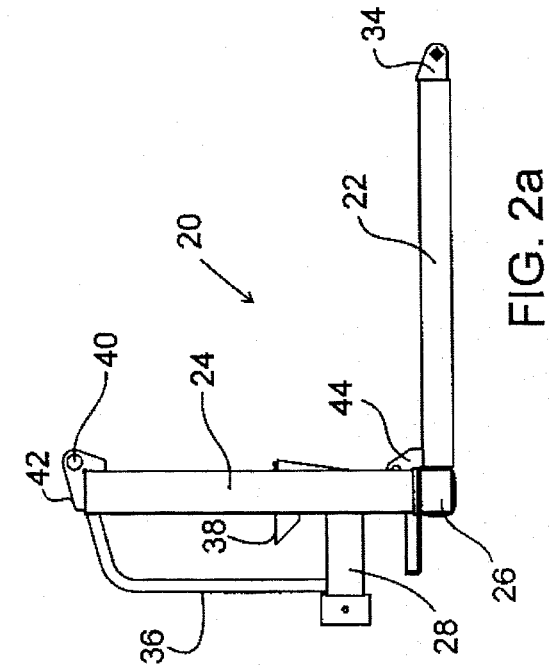

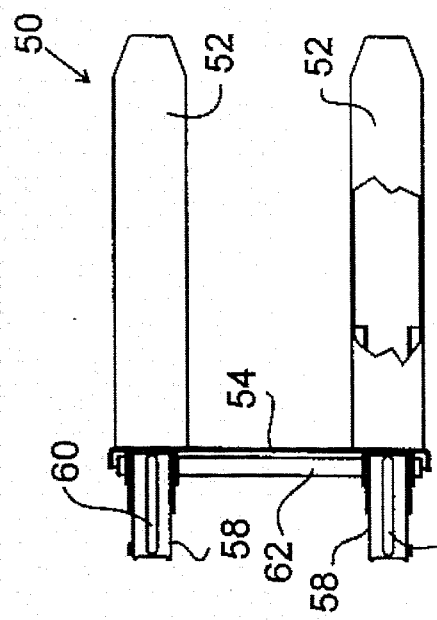
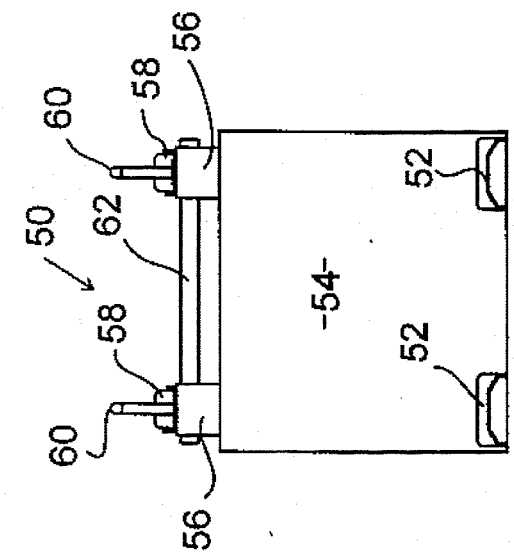
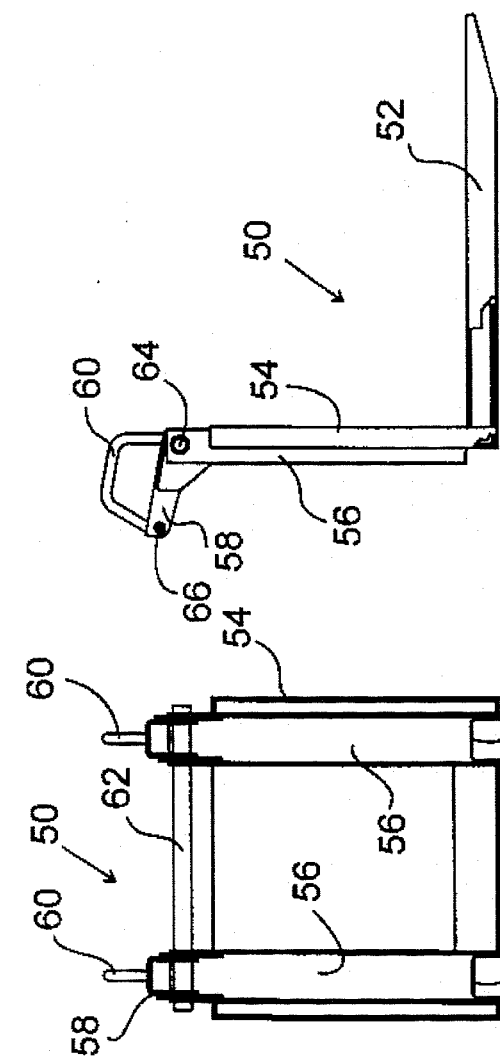
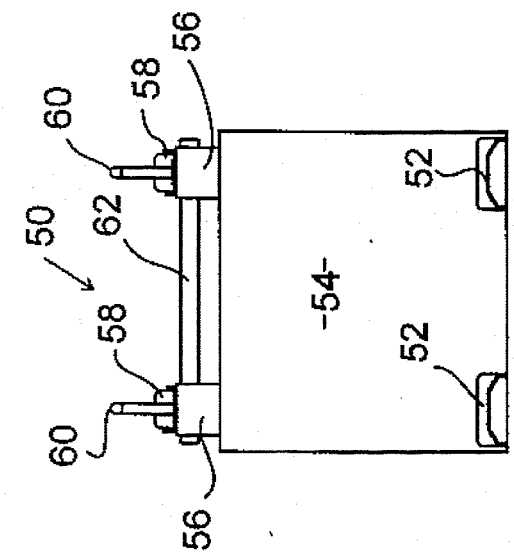

BIN POSITIONING DEVICE

BACKGROUND OF THE INVENTION

1. Field of the Invention

The present invention relates to equipment for transporting and positioning tote boxes and wire or steel containers. More specifically, the invention is directed to an improved box tilter for easy access to the contents of such containers.

2. Description of the Related Art

Bin containers of the tote-box and wire- or steel-wall type are used very commonly in manufacturing and warehousing, where prompt and safe access to the contents of a bin is critical for an efficient work environment. For productivity, it is important that workers have a clear view of the items stored in a container, so that they may be able to selectively reach the desired item directly and quickly. For safety, it is essential that workers be able to reach a desired item in the container without bending or stretching beyond normal posture.

With these considerations in mind, many devices have been developed for receiving, storing, transporting and tilting box containers. Typically, these devices consist of a movable support chassis with two vertical masts and a box frame pivotally mounted to the top of the masts. The box frame can assume various tilted positions with respect to the masts, thereby allowing easy access to its contents by a user standing on the other side of the masts. For example, Canadian Patent No. 1,254,861 (1989) describes a tote box tilter having approximately ground-level, horizontal forks mounted on a movable chassis and adapted for supporting a container. The forks are integral with horizontal radial arms projecting forward and pivotally coupled to the top portion of vertical masts integral with the chassis. A hydraulic cylinder is connected in extensible pushing relation between the chassis and the radial arms, such that the radial arms and the forks are pushed upwards as the cylinder is extended. Thus, a container initially placed on the forks is raised and tilted by the action of the cylinder and, when the radial arms and forks reach a substantially vertical position, the container is completely tilted by 90 degrees, thereby allowing a user to reach its bottom without bending forward.

Similar box-tilter equipment is described in Japanese Patents No. 1-38154, No. 59-9731, No. 61-7198, No. 61-169499, No. 61-185792 and No. 62-68999. All of these devices utilize radial-arm means to lift and tilt a container placed on forks or equivalent means attached to the arms. One side of the radial-arm means is hinged to a chassis' vertical masts and the other side is rigidly connected to the forks. In all devices, the actuating force necessary to lift and tilt the forks and the container is provided by hydraulic means connected in extensible pushing relation between the chassis and the radial-arm means, the latter coupling being at a point between the connections with the masts and the forks. Thus, inasmuch as the radial-arm means constitutes the lever arm for pivoting the forks of the device, it must be sufficiently long to permit the use of a reasonably sized and affordable hydraulic cylinder. As well understood by those skilled in the art, a short radial arm would require a correspondingly more powerful hydraulic system and might increase the cost of the device beyond commercial viability. Therefore, radial arms about 30 to 40 centimeter long are typically used.

Inherent in this configuration is the fact that the length of the radial arm necessarily increases the distance of the lifting forks (and therefore also of the container supported by them) from the hinge point on the chassis, which makes it harder for a user to reach the container before it is completely lifted and tilted. In addition, the length of the radial arm increases the height of the container in its lifted position, thereby also limiting its accessibility. If the radial arm is too short, a prohibitively powerful cylinder may be required; if the radial arm is too long, the resulting position of the container may be offset too much for comfortable access by a user. Therefore, there remains a need for an improved box tilter that is designed to overcome these shortcomings. This invention is directed at providing such an improvement.

SUMMARY OF THE INVENTION

One objective of this invention is a box tilter that reduces the distance between the lifting forks and the hinge point on the chassis of the tilter, thereby increasing accessibility to the contents of a container positioned thereon.

Another objective is a device having an actuating mechanism that operates under tension, rather than compression.

Finally, another goal is the implementation of the above mentioned objectives in a commercially viable system that maximizes the utilization of existing technology.

Therefore, according to these and other objectives, the present invention consists of a box tilter comprising a movable chassis and a container-supporting frame directly hinged to the chassis. The actuating force for lifting and tilting the container is provided by a hydraulic cylinder connected in retractable pulling relation between the chassis and a radial arm rigidly attached to the container-supporting frame and projecting backward from the hinge point. This radial-arm configuration reduces the distance of the container from the operator of the device and results in improved access to the items in the container.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIGS. 2a, 2b and 2c are simplified side, top and front views, respectively, of the chassis of the box tilter shown in FIG. 1.

FIGS. 3a, 3b, 3c and 3d are simplified top, rear, side and front views, respectively, of the box frame of the box tilter of FIG. 1.

DESCRIPTION OF THE PREFERRED EMBODIMENTS OF THE INVENTION

The heart of this invention lies in the configuration of the actuating mechanism for lifting and tilting the box frame of the tilter. By utilizing a lever arm projecting backward with respect to the hinge point of the box frame on the chassis, access to the box by a user situated at the back of the tilter is improved significantly.

Figure 1:
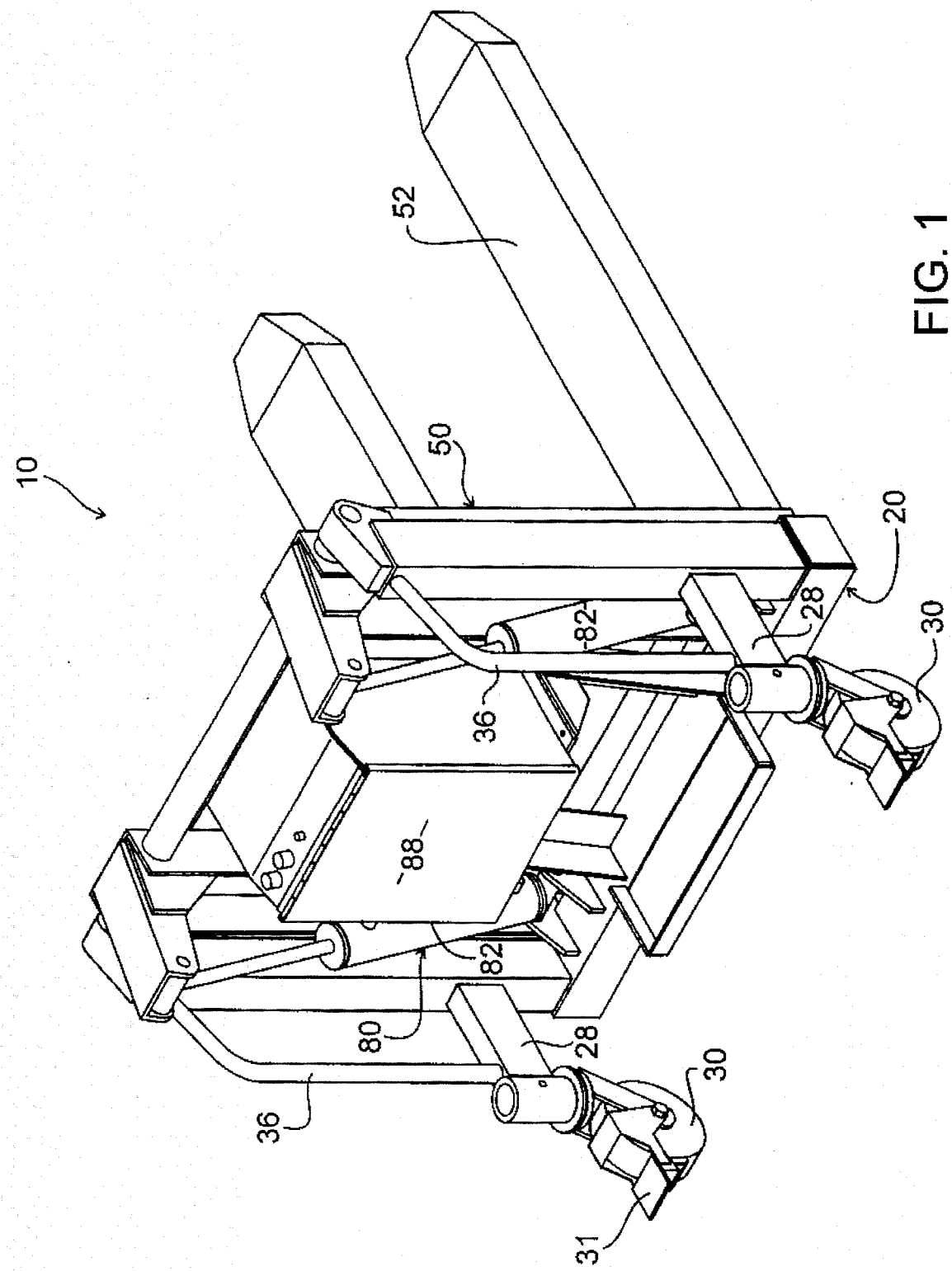
FIG. 1 is a perspective view of a box tilter according to the present invention.

Referring to the drawings, wherein like parts are designated throughout with like numerals and symbols, FIG. 1 shows the preferred embodiment of a box tilter 10 according to the invention in perspective view. The device comprises a chassis 20, a box frame 50 pivotally connected to the chassis, and a hydraulic mechanism 80 coupled to the two parts. As illustrated in the simplified side, top and front views of FIGS. 2a, 2b and 2c, respectively, the chassis 20 consists of two substantially-parallel horizontal legs 22 projecting forward and two substantially vertical masts 24 projecting upward from a transverse beam 26. These parts are rigidly connected to one another and form a substantially L-shaped framework for supporting the box-tilting mechanism of the invention. Backward-projecting caster legs 28 are adapted to receive swivel casters 30 equipped with standard foot brakes 31 (FIG. 1) which, in conjunction with load rollers 32 (shown in FIG. 4) mounted on forks 34 at the tips of the legs 22, render the chassis movable over a supporting surface. Lower handle bars 36 are provided to maneuver the box tilter while it is being moved from place to place. Finally, a control-console support frame 38 is also rigidly mounted on the transverse beam 26 of the chassis 20.

FIGS. 3a, 3b, 3c and 3d are simplified top, rear, side and front views, respectively, of the box frame 50 of the box tilter of the invention. The frame 50 comprises two lift forks 52 projecting forward horizontally from two vertical support beams 56; a vertical back panel 54 is attached to the beams 56. Preferably, the forks 52 have a U-shaped cross-section of channel construction designed to wrap around the legs 22 for compactness and strength. Similarly, the beams 56 also preferably have a channel-shaped cross-section that allows them to be positioned around portions of the hydraulic cylinders used to lift the box frame 50. Two radial arms 58, rigidly connected to the upper portion of the beams 56, project backwards from beams 56 in a substantially horizontal position. Upper handle bars 60 are provided for maneuvering the box tilter when in a tilted position.

Figure 4:
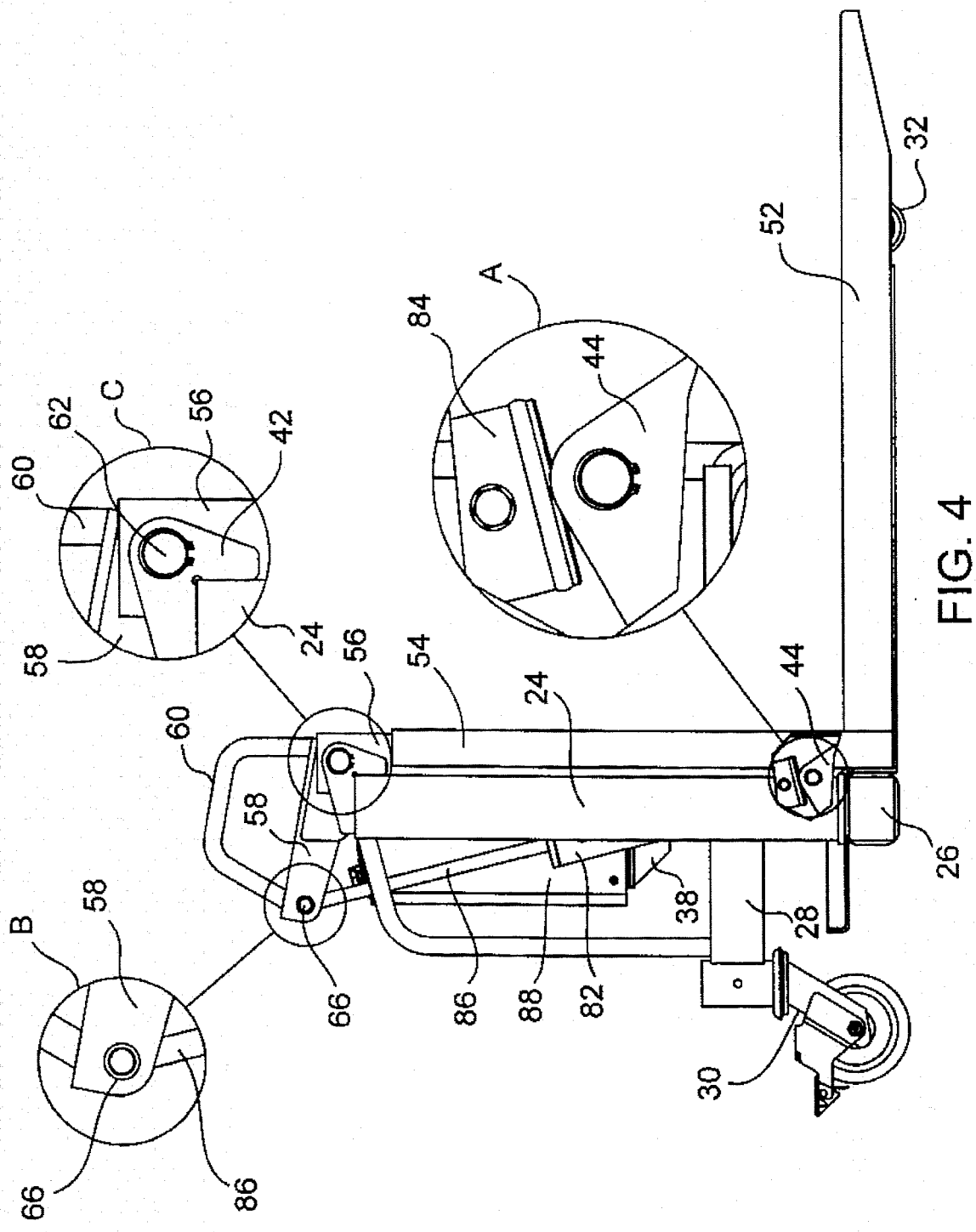
FIG. 4 is an elevational side view of the box tilter of FIG. 1.

The box frame 50 is pivotally connected to the chassis 20 by means of a pivot shaft 62 (a fulcrum point) mounted in appropriately aligned holes 40 and 64 in support blocks 42 at the top of the chassis and of the beams 56 of the box frame, respectively. Because of the conforming shapes of the forks and legs and of the beams and masts, respectively, the parts may be assembled to form a compact unit wherein the box frame 50 is adapted for upward pivotal movement with respect to the chassis 20 by rotation around the pivot shaft 62. FIG. 4 shows the assembled components in elevational side view.

Figure 5:
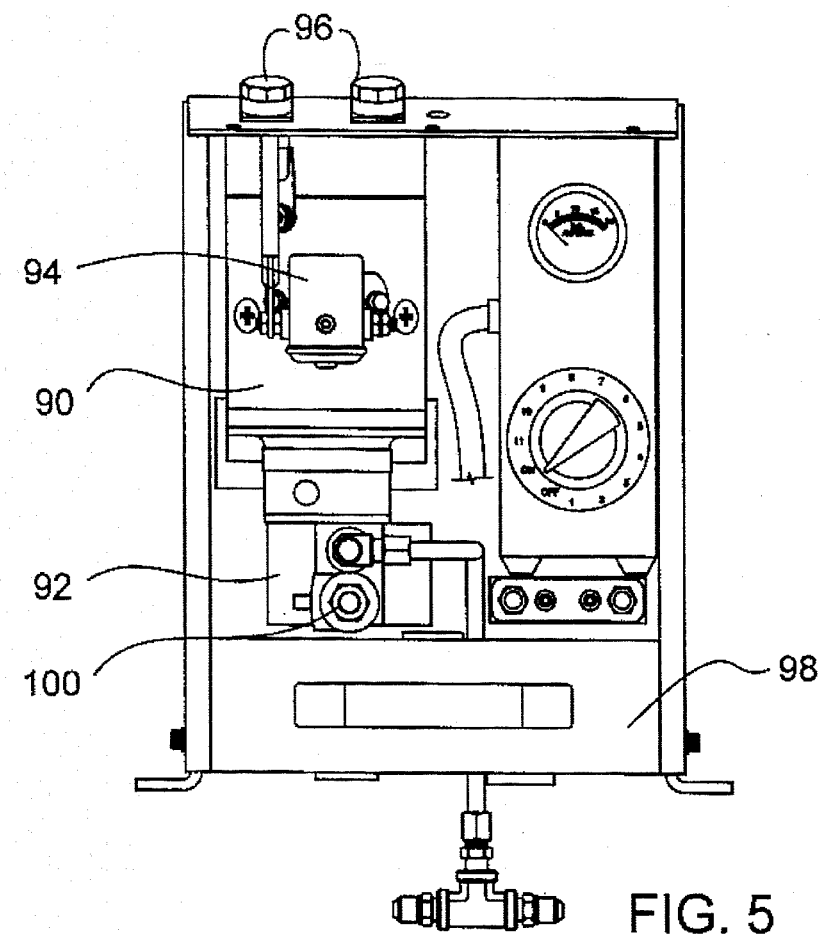
FIG. 5 is an elevational view of the control console in the preferred embodiment of the invention.

The actuating mechanism for tilting the box frame 50 consists of a hydraulic cylinder system 80 mounted in retractable pulling relation between the chassis 20 and the radial arm 58 of the box frame. In the preferred embodiment, two hydraulic cylinders 82 are each pivotally connected to mounting forks 44 rigidly attached to the transverse beam 26 of the chassis and to hinges 66 at the outer end of each radial arm 58. As better illustrated in details A and B of FIG. 4, each cylinder 82 is preferably placed with its housing side 84 connected to a mounting fork 44 and its rod side 86 connected to a radial arm's hinge 66. The power to lift the box frame and any bin supported by it is provided by contraction of the cylinder, preferably by operation of a hydraulic pump actuated by a battery-powered electric motor, such that the cylinder is contracted when the hydraulic fluid's pressure is increased and extended when it is released. These components of the invention are not shown in detail because well understood in the art; in the preferred embodiment of this invention, they are contained in a control console 88 mounted on the chassis 20. The console 88 is illustrated in FIG. 5, where reference numerals 90 and 92 identify an electric motor and a hydraulic pump controlled by a solenoid-start switch 94 actuated by on and off control buttons 96. A hydraulic-fluid reservoir 98 provides the actuating fluid to the pump 92. The cylinders 82 can be single acting, with a fluid return line controlled by the release valve 100. Note that this arrangement results in having the cylinder in tension as the box frame 50 is lifted and tilted around the pivot shaft 62 (see detail C in FIG. 4) during all operative positions of the tilter, thereby providing a stable connection even when fully loaded. This configuration eliminates the chances of buckling under extreme conditions and therefore also the chances of tipping over and dropping the load off the tilter, which may result from buckling of prior-art devices.

Figure 6:
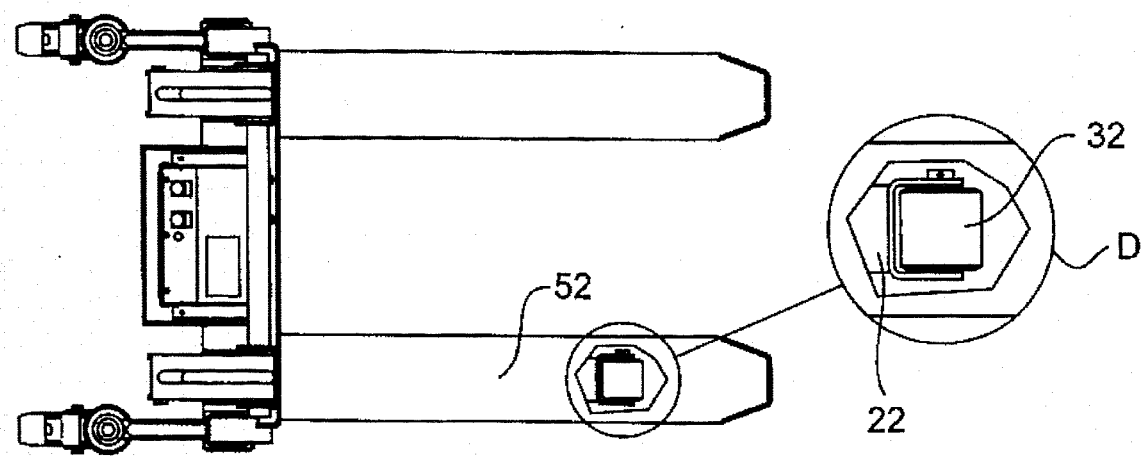
FIG. 6 is a top view of the box tilter of FIG. 1.
Figure 8:
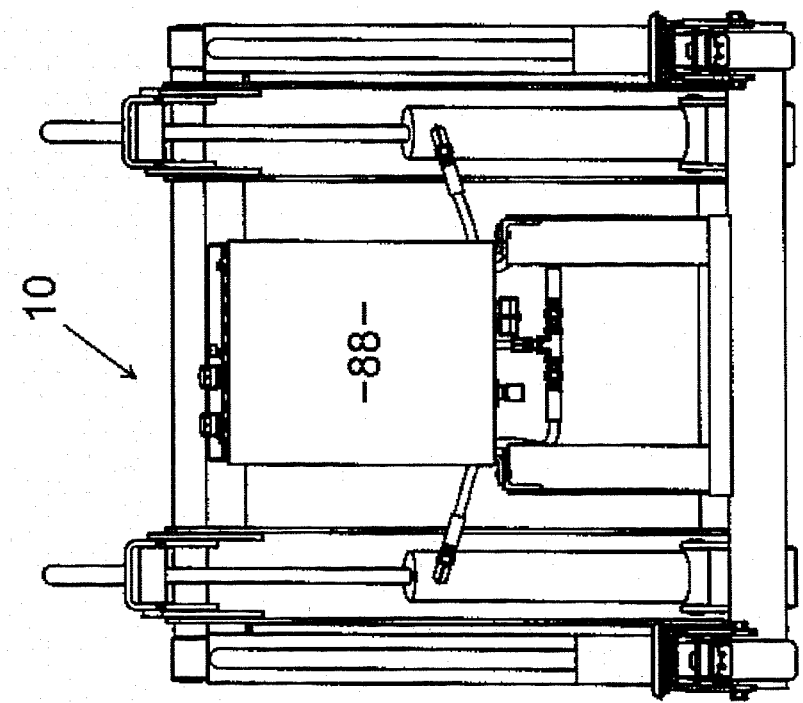
FIG. 8 is an elevational back view of the box tilter of FIG. 1.
Figure 7:
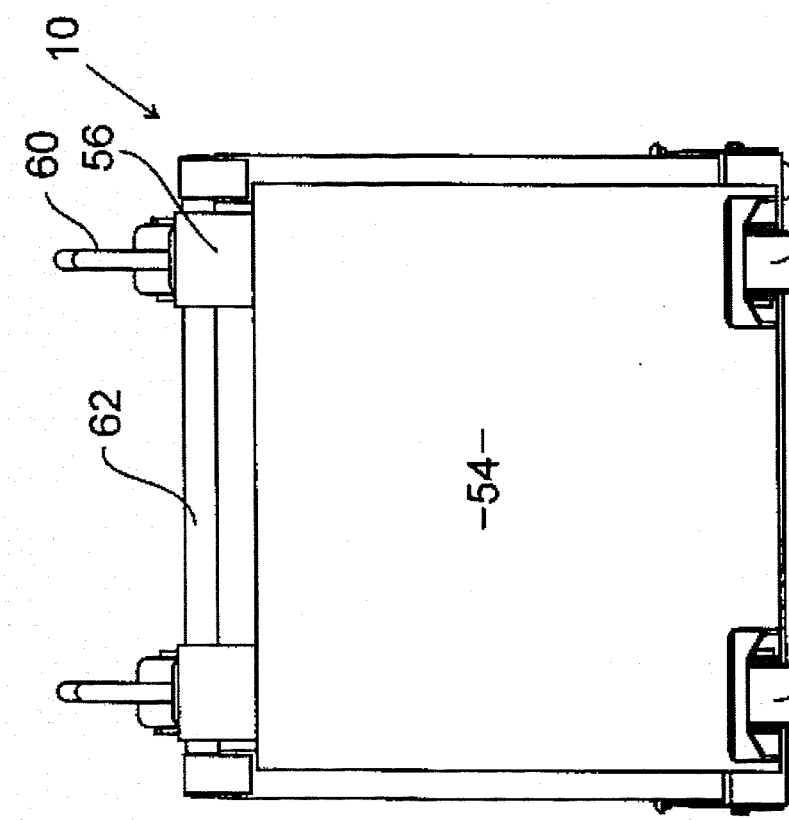
FIG. 7 is an elevational front view of the box tilter of FIG. 1.

FIGS. 6, 7 and 8 show top, front and rear views of the box tilter of FIG. 1. Detail D in FIG. 6 shows a load roller 32 mounted on a leg 22 through a cut-out portion of a lift fork 52. The combination of rollers 32 with casters 30 provides stable support for rolling the box tilter 10 on a flat surface even when loaded.

Figure 9:
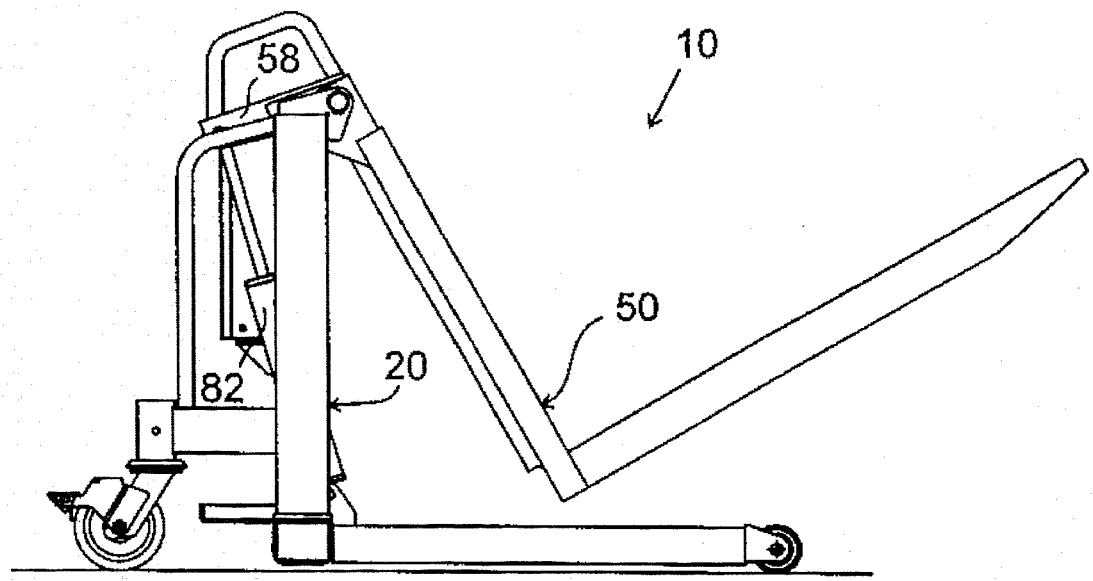
FIG. 9 is an elevational side view of the box tilter of FIG. 1 showing the box frame in a partially tilted position.

In operation, the box frame 50 is tilted by pressurizing the hydraulic system 80. The pressure causes the cylinders 82 to contract and pull the radial arms 58 downward, with a corresponding upward tilt of the box frame 50, as shown FIG. 9.

Figure 10:
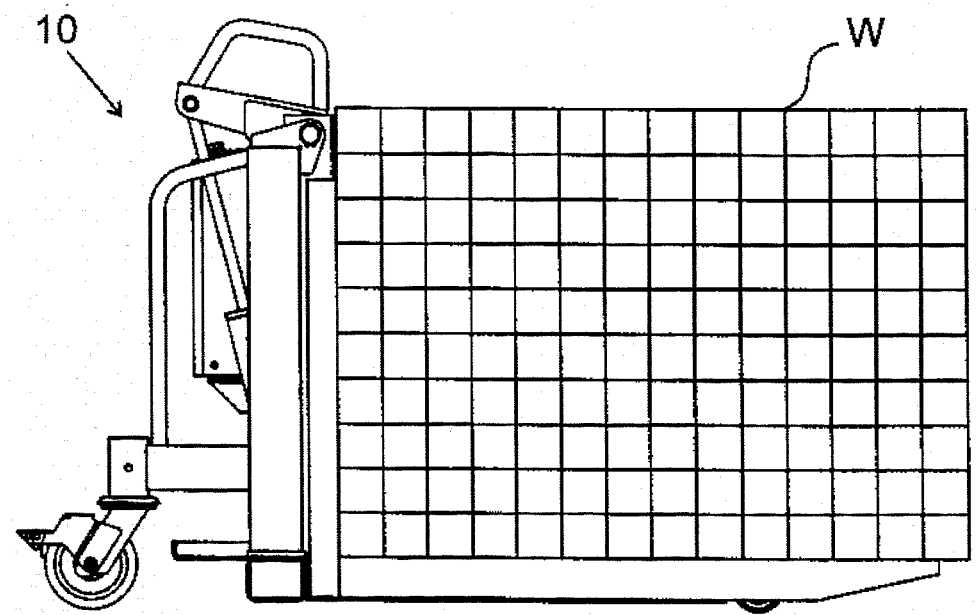
FIG. 10 is a side view of the box tilter of FIG. 1 in a lowered position and showing the box frame loaded with a wire basket.
Figure 12:
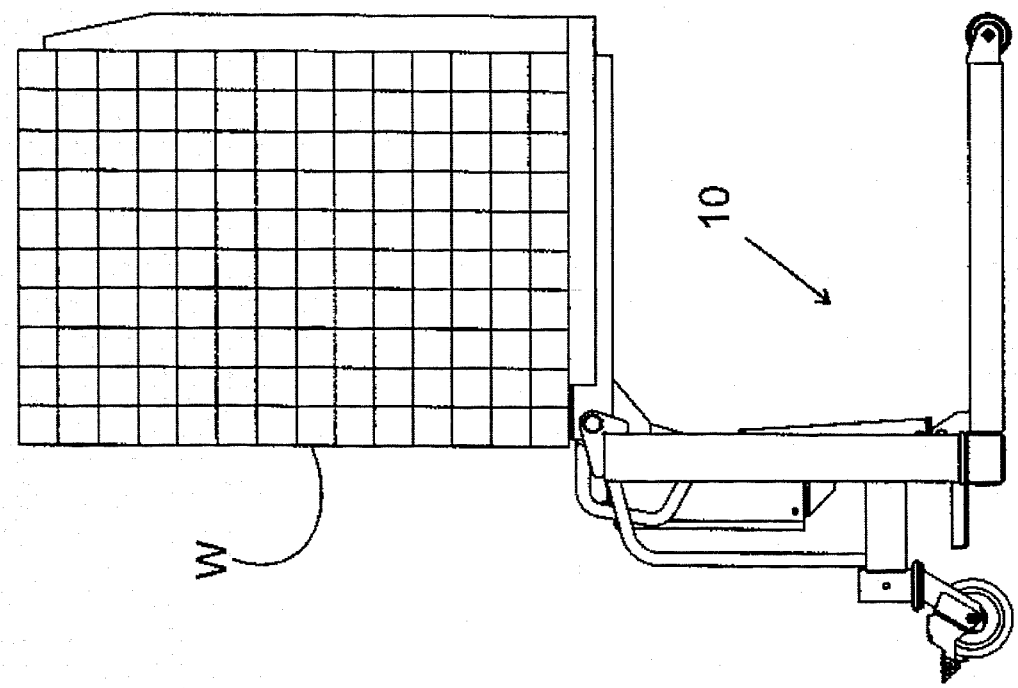
FIG. 12 is a side view of the box tilter of FIG. 11 in a completely tilted position.
Figure 11:
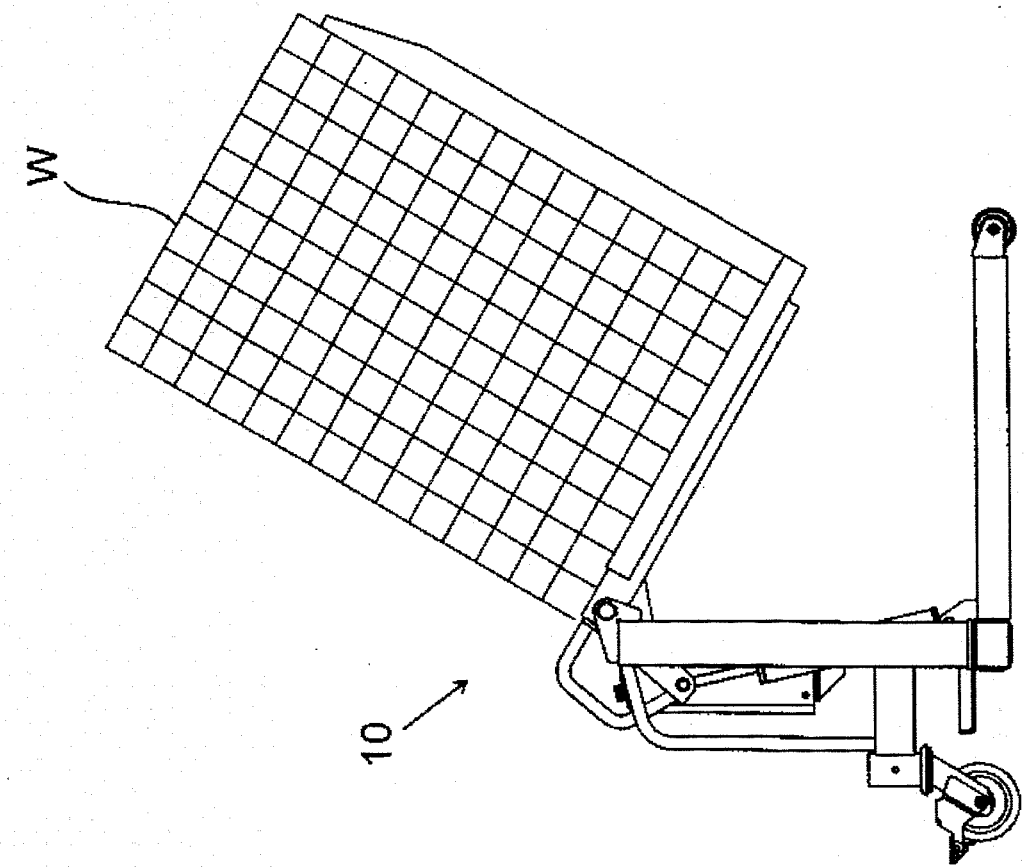
FIG. 11 is a side view of the box tilter of FIG. 10 in a partially tilted position.

In order to optimize the efficiency of the level action provided by the radial arms 58, they are preferably disposed at a slightly-positive angle with respect to a horizontal position, as seen in FIG. 3c. This configuration provides additional travel to the motion of the radial arm as the cylinder 82 pulls it downward, thereby making it possible to raise the box frame to a completely-vertical position or, if desired, even beyond. In the preferred embodiment of the invention the radial arms 58 form an angle of about 10 to 15 degrees when the box frame is completely lowered. The preferred length of the radial arms 58 of the invention is between 10 and 25 centimeters, depending on the required level-arm action required by the application. FIGS. 10, 11 and 12 illustrate the box tilter 10 of the invention in use while lifting and tilting an empty, typical wire basket W.

While the present invention is described with reference to particular embodiments, those skilled in the art will recognize that many variations and geometries may be employed without departing from the spirit and scope of the invention as set forth in the claims. For example, while a hydraulic system is a proven and convenient actuating means for the system, there may be applications where, with suitable adjustments of the components, a rack-and-pinion or other equivalent means can be used. Similarly, a single radial-arm and single-cylinder system could be adopted in equivalent fashion. A dual-cylinder system is preferred because of the symmetrical application of stresses that provides balance and stability, and because it permits the use of smaller hydraulic cylinders. In addition, the two radial arms and cylinders may be conveniently located at each side of the back of the box tilter, thereby making it possible for a user to reach toward the box frame without encroaching over them.

Therefore, it is understood that many equivalent systems are possible within the scope of the present invention and that those skilled in the art could easily design a special system for a specific application. Thus, various changes in the details and steps that have been described may be made by those skilled in the art within the principles and scope of the invention herein illustrated and defined in the appended claims. While the present invention has been shown and described in what are believed to be the most practical and preferred embodiments, it is not to be limited to the details disclosed herein, but is to be accorded the full scope of the claims so as to embrace any and all equivalent apparatus and methods.

I claim:

1. Bin positioning apparatus comprising, in combination:
   (a) a chassis having a front side and a back side;
   (b) a box frame pivotally coupled to said chassis, said box frame being adapted to receive a bin in said front side of the chassis and including radial-arm means rigidly attached to the box frame and extending into said back side of the chassis; and
   (c) actuating means having a first end hingedly connected to said chassis and a second end hingedly connected to said radial-arm means, wherein said actuating means is adapted to cause said box frame to pivot to an elevated position when the actuating means pulls the radial-arm means, thereby said bin is elevated to facilitate access thereto.

2. The apparatus recited in claim 1, wherein said chassis comprises two substantially-parallel horizontal legs projecting toward said front side and two substantially vertical masts projecting upward from a transverse beam, and wherein said box frame is pivotally coupled to said substantially vertical masts.

3. The apparatus recited in claim 2, wherein said box frame comprises two substantially-parallel lift forks projecting forward horizontally toward said front side.

4. The apparatus recited in claim 3, wherein said forks have a U-shaped cross-section of channel construction adapted to wrap around said legs.

5. The apparatus recited in claim 4, wherein said box frame further comprises two vertical support beams and a vertical back panel attached to said beams.

6. The apparatus recited in claim 5, wherein said support beams have a channel-shaped cross-section.

7. The apparatus recited in claim 3, wherein said box frame further comprises two vertical support beams and a vertical back panel attached to said beams.

8. The apparatus recited in claim 2, wherein said chassis further comprises two load rollers mounted on said horizontal legs and two swivel casters mounted on said transverse beam.

9. The apparatus recited in claim 8, wherein at least one of said swivel casters comprises a brake.

10. The apparatus recited in claim 1, wherein said chassis is mounted on at least four wheels.

11. The apparatus recited in claim 1, wherein said box frame comprises two substantially-parallel lift forks projecting forward horizontally toward said front side.

12. The apparatus recited in claim 1, wherein said actuating means consists of at least one hydraulic cylinder.

13. The apparatus recited in claim 1, wherein said radial-arm means is disposed at a positive angle with respect to a horizontal position.

14. The apparatus recited in claim 1, wherein said radial-arm means is disposed at an angle of about 10 to 15 degrees with respect to a horizontal position.

15. The apparatus recited in claim 14, wherein said radial-arm

16. The apparatus recited in claim 1, wherein said radial-arm means is approximately 10 to 25 centimeters long.

17. Bin positioning apparatus comprising, in combination:
   (a) a chassis having vertically-elongated support mast means rigidly connected thereto and comprising a fulcrum point defining a front side and a back side of the chassis;
   (b) a box frame pivotally coupled to the support mast means at said fulcrum point, said box frame being adapted to receive a bin in said front side of the chassis and including radial-arm means having a back portion extending into said back side of the chassis; and
   (c) actuating means having a first end hingedly connected to said chassis and a second end hingedly connected to said back portion of the radial-arm means, wherein said actuating means is adapted to cause said box frame to pivot to an elevated position when the actuating means pulls the radial-arm means, thereby said bin is elevated to facilitate access thereto means is approximately 10 to 25 centimeters long.

18. The apparatus recited in claim 17, wherein said chassis also comprises a transverse beam connecting said support mast means and two substantially horizontal legs projecting toward said front side from said support mast means; wherein said chassis further comprises two load rollers mounted on said horizontal legs and two swivel casters mounted on said transverse beam; wherein at least one of said swivel casters comprises a brake; wherein said box frame comprises two lift forks projecting forward horizontally toward said front side having a U-shaped cross-section of channel construction adapted to wrap around said legs; wherein said box frame further comprises two vertical support beams of channel-shaped construction and a vertical back panel attached to said beams; wherein said actuating means consists of at least one hydraulic cylinder; and wherein said radial-arm means is approximately 10 to 25 centimeters long.

19. A method for tilting a bin to an elevated position to facilitate access thereto, comprising the following steps:
   (a) providing a chassis having a front side and a back side;

(b) providing a box frame pivotally coupled to said chassis, said box frame being adapted to receive a bin in said front side of the chassis and including radial-arm means rigidly attached to the box frame and extending into said back side of the chassis; and (c) providing actuating means having a first end hingedly connected to said chassis and a second end hingedly connected to said radial-arm means, wherein said actuating means is adapted to cause said box frame to pivot to an elevated position when the actuating means pulls the radial-arm means; and (d) operating said actuating means to cause said box frame and bin to pivot to a desired elevated position.

* * * * *

UNITED STATES PATENT AND TRADEMARK OFFICE
CERTIFICATE OF CORRECTION

PATENT NO. : 5,538,389
DATED      : July 23, 1996
INVENTOR(S): Robert M. Stone

It is certified that error appears in the above-identified patent and that said Letters Patent is hereby corrected as shown below:

Column 6, line 22, insert: --means is approximately 10 to 25 centimeters long.--after "radial arm"

Column 6, line 44 to 45, delete:--means is approximately 10 to 25 centimeters long--after "thereto"

Signed and Sealed this

First Day of October, 1996

BRUCE LEHMAN

Attest:

Attesting Officer

Commissioner of Patents and Trademarks